(12) United States Patent
Anegawa (10) Patent No.: US 11,878,454 B2
(45) Date of Patent: Jan. 23, 2024

(54) PLASTICIZER, THREE-DIMENSIONAL MODELER, AND INJECTION MOLDER

(71) Applicant: SEIKO EPSON CORPORATION, Tokyo (JP)

(72) Inventor: Kenta Anegawa, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/969,716

(22) Filed: Oct. 20, 2022

(65) Prior Publication Data

US 2023/0125214 A1  Apr. 27, 2023

(30) Foreign Application Priority Data

Oct. 21, 2021 (JP) ................. 2021-172194

(51) Int. Cl.
*B29C 45/60* (2006.01)
*B29C 64/20* (2017.01)
*B29C 45/62* (2006.01)
*B29C 64/118* (2017.01)
*B33Y 30/00* (2015.01)
*B29C 45/74* (2006.01)
*B29C 45/47* (2006.01)

(52) U.S. Cl.
CPC .............. *B29C 45/62* (2013.01); *B29C 45/47* (2013.01); *B29C 45/60* (2013.01); *B29C 45/74* (2013.01); *B29C 64/118* (2017.08); *B29C 64/20* (2017.08); *B33Y 30/00* (2014.12)

(58) Field of Classification Search
CPC ....... B29C 45/62; B29C 45/361; B29C 45/68; B29C 45/875; B29C 45/78; B29C 45/1775
See application file for complete search history.

(56) References Cited

U.S. PATENT DOCUMENTS

2018/0272297 A1* 9/2018 Welb .................. B29B 7/483
2018/0311894 A1* 11/2018 Saito .................. B29C 64/40

FOREIGN PATENT DOCUMENTS

JP       2010-241016 A    10/2010

* cited by examiner

*Primary Examiner* — Armand Melendez
(74) *Attorney, Agent, or Firm* — Harness, Dickey & Pierce, P.L.C.

(57) ABSTRACT

A plasticizer includes a drive motor, a flat screw that has a groove forming surface where a groove is formed and is rotated by the drive motor, a barrel which has a groove facing surface that faces the groove forming surface and in which a communication hole is formed, and a heater that heats resin pellets supplied to the space between the flat screw and the barrel, and at least one of the flat screw and the barrel is at least partially formed of a transparent member, and the resin pellets between the flat screw and the barrel is visible through the transparent member.

7 Claims, 11 Drawing Sheets

PLASTICIZER, THREE-DIMENSIONAL MODELER, AND INJECTION MOLDER

The present application is based on, and claims priority from JP Application Serial Number 2021-172194, filed Oct. 21, 2021, the disclosure of which is hereby incorporated by reference herein in its entirety.

BACKGROUND

1. Technical Field

The present disclosure relates to a plasticizer, a three-dimensional modeler, and an injection molder.

2. Related Art

A plasticizer that plasticizes a resin material is used in a three-dimensional modeler and an injection molder based on thermal melting and lamination. The plasticizer disclosed in JP-A-2010-241016 includes a rotor in the form of a flat screw and a barrel that faces the rotor. The rotor has the shape of a substantially circular plate and has a spiral groove formed based on an involute curve in a surface perpendicular to the axis of rotation of the rotor. The rotor is rotated by a motor.

The barrel includes a heater, which melts a resin pellet, and a channel along which the melted resin material passes. The resin pellet is melted and pressurized in the spiral groove. The melted and pressurized resin material is press-fit into the channel of the barrel. The process of transforming the resin pellet into the melted resin material is called plasticization. The resin material resulting from the plasticization of the resin pellet is called a plasticized material or a molding material.

The rotor is disposed in a casing as a screw case. The casing has a supply port via which the resin pellet is supplied to the rotor. The resin pellet is loaded via the supply port into the spiral groove, which opens via the outer circumferential side surface of the rotor.

In a plasticizer of the type shown in JP-A-2010-241016, the resin material is generated when the transportation of the resin pellet and the plasticization of the resin pellet perfectly balance with each other. When the balance between the transportation and the plasticization of the resin pellet deteriorates, the resin material is not stably melted. Ideally, it is desirable to achieve a plasticized state in which the solid state of the material is maintained in the vicinity of the material supply portion and the material gradually plasticizes as it moves toward the outlet. For example, when the material has plasticized all the way to the vicinity of the material supply portion, no transportation force is produced, resulting in not only unstable discharge but a situation in which no new material is supplied so that the plasticization is unstable. The behavior described above also holds true for a plasticizer including a rotor in the form of an in-line screw, which differs from the rotor described in JP-A-2010-241016.

JP-A-2010-241016, however, does not disclose a technique for checking the location where the resin pellet has plasticized in the spiral groove of the rotor of the plasticizer, or does not suggest such a technique. A plasticizer that allows checking of the plasticization state in the rotor has therefore been desired.

SUMMARY

A plasticizer includes a drive motor, a flat screw that has a groove forming surface where a groove is formed and is rotated by the drive motor, a barrel which has a groove facing surface that faces the groove forming surface and in which a communication hole is formed, and a heater that heats a material supplied to a space between the flat screw and the barrel, and at least one of the flat screw and the barrel is at least partially formed of a transparent member, and the material between the flat screw and the barrel is visible through the transparent member.

A plasticizer includes a drive motor, an in-line screw that has a groove forming surface where a groove is formed and is rotated by the drive motor, a barrel which has a groove facing surface that faces the groove forming surface and in which a communication hole is formed, and a heater that heats a material supplied to a space between the in-line screw and the barrel, and at least part of the barrel is formed of a transparent member, and the material between the in-line screw and the barrel is visible through the transparent member.

A three-dimensional modeler includes the plasticizer described above, a nozzle via which a plasticized material supplied from the plasticizer is discharged, and a stage that receives the plasticized material discharged via the nozzle.

An injection molder includes the plasticizer described above and a nozzle via which a plasticized material supplied from the plasticizer is injected toward a molding die.

DESCRIPTION OF EXEMPLARY EMBODIMENTS

First Embodiment

Figure 1:
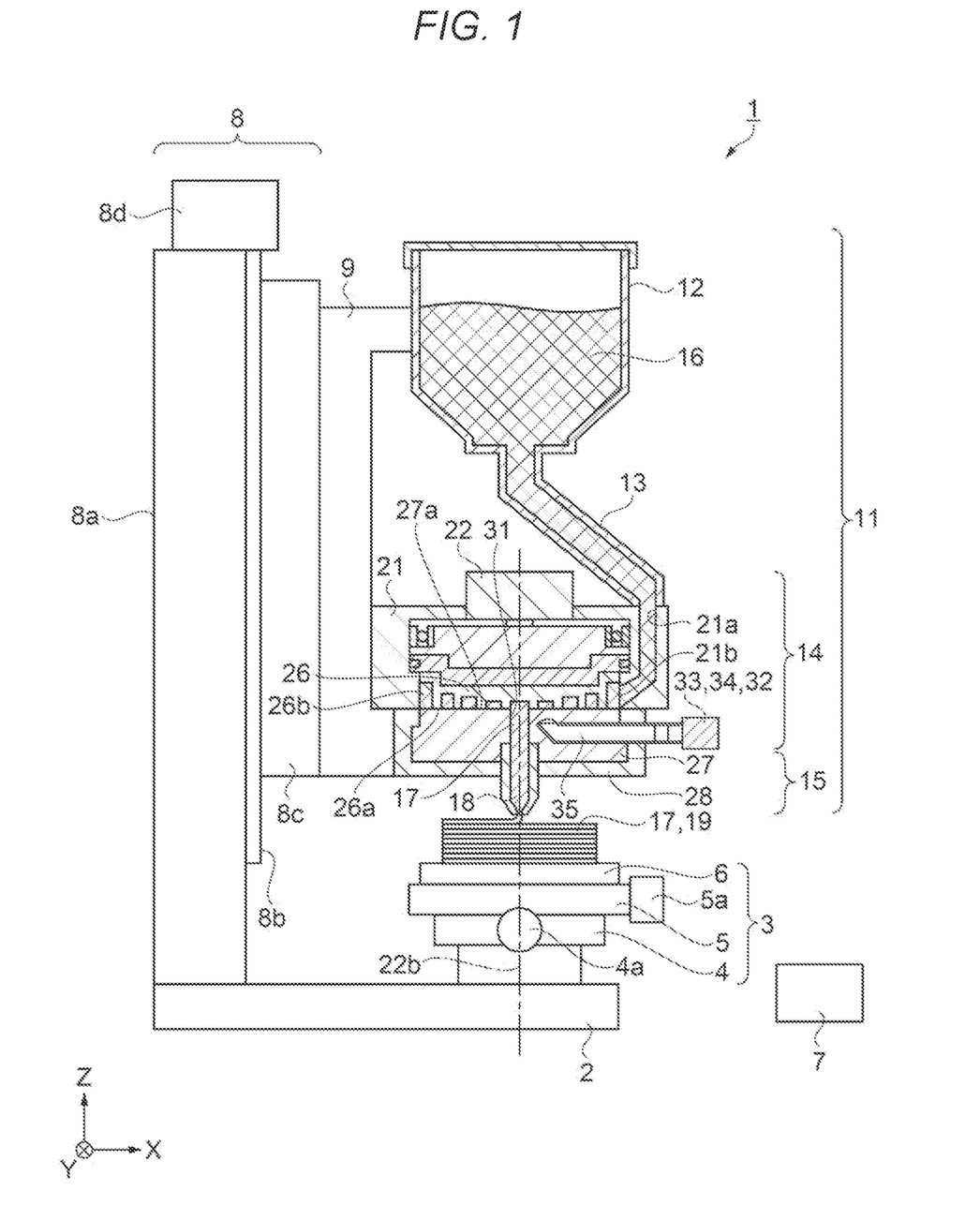
FIG. 1 is a schematic view showing the configuration of a three-dimensional modeler according to a first embodiment.

In the present embodiment, a characteristic example of a three-dimensional modeler including a plasticizer will be described with reference to the drawings. FIG. 1 shows arrows along directions X, Y, and Z perpendicular to one another. The directions X and Y extend along the horizontal direction, and the direction Z extends along the vertical direction. The direction of gravity is oriented toward the negative side of the direction Z.

A three-dimensional modeler 1 includes a base 2, as shown in FIG. 1. A stage 3 is disposed on the base 2. The stage 3 is formed of a Y stage 4, an X stage 5, and a receiving plate 6 stacked in this order toward the positive side of the direction Z.

The Y stage 4 includes an axis-Y motor 4a, a ball screw, an axis-Y scale, and other components. The Y stage 4 moves the receiving plate 6 back and forth in the direction Y. The X stage 5 includes an axis-X motor 5a, a ball screw, an axis-X scale, and other components. The X stage 5 moves the receiving plate 6 back and forth in the direction X.

The three-dimensional modeler 1 includes a controller 7. The controller 7 controls the movement of the Y stage 4 and the X stage 5. The controller 7 recognizes the position of the receiving plate 6 in the direction Y based on information outputted by the axis-Y scale. The controller 7 recognizes the position of the receiving plate 6 in the direction X based on information outputted by the axis-X scale. The controller 7 moves the Y stage 4 and the X stage 5 in such a way that there is no difference between a target position to which the receiving plate 6 is moved and the current position of the receiving plate 6. The controller 7 controls the trajectory along which the receiving plate 6 moves by successively changing the target position to which the receiving plate 6 is moved.

An elevation stage 8 is disposed on the base 2 on the side thereof facing the negative side of the direction X. The elevation stage 8 includes a fixed table 8a, which stands on the base 2. A rail 8b is disposed at a surface of the fixed table 8a, the surface facing the positive side of the direction X. A moving table 8c is disposed on a side of the rail 8b, the side facing the positive side of the direction X. The moving table 8c moves in the direction Z along the rail 8b.

An axis-Z motor 8d is disposed on a side of the fixed table 8a, the side facing the positive side of the direction Z. The fixed table 8a accommodates a ball screw and an axis-Z scale. The controller 7 controls the movement of the moving table 8c as well as the Y stage 4 and the X stage 5.

A unit support 9 is installed on a side of the moving table 8c, the side facing the positive side of the direction X. A molding unit 11 is disposed on a side of the unit support 9, the side facing the positive side of the direction X, and the unit support 9 supports the molding unit 11. In the molding unit 11, a material supplier 12, a coupling tube 13, a plasticizer 14, and a discharger 15 are arranged in this order toward the negative side of the direction Z. The three-dimensional modeler 1 thus includes the plasticizer 14.

In the present embodiment, the stage 3 moves in the directions X and Y, and the modeling unit 11 moves in the direction Z. Instead, the stage 3 may not move but the modeling unit 11 may move in the directions X, Y, and Z, or the stage 3 may move in the direction Z and the modeling unit 11 may move in the directions X and Y.

The material supplier 12 is a container having a cavity provided therein. Resin pellets 16 as a material are housed in the material supplier 12. The resin pellets 16 are each a resin block. Each of the resin pellets 16 does not necessarily have a specific size and may have a size ranging, for example, from 5 to 20 mm in the present embodiment. The resin pellets 16 are instead made of resin containing metal, ceramic, carbon fibers, or other substances.

The coupling tube 13 is coupled to the bottom of the material supplier 12. The resin pellets 16 move due to their own weight from the interior of the material supplier 12 into the coupling tube 13. The coupling tube 13 is further coupled to the plasticizer 14. The resin pellets 16 are supplied via the coupling tube 13 to the plasticizer 14.

The plasticizer 14 plasticizes the resin pellets 16. The term "plasticization" is a concept including melting and is transformation from a solid state into a fluid state. Specifically, in the case of a material that undergoes glass transition, the plasticization is the process of raising the temperature of the material to be higher than or equal to the glass transition point thereof. In the case of a material that does not undergo glass transition, the plasticization is the process of raising the temperature of the material to be higher than or equal to the melting point thereof. The plasticizer 14 plasticizes the resin pellets 16 into a plasticized material 17.

The three-dimensional modeler 1 includes a nozzle 18. The plasticized material 17 supplied from the plasticizer 14 is discharged via the nozzle 18 to the receiving plate 6. The receiving plate 6 of the stage 3 receives the plasticized material 17 discharged via the nozzle 18. While the plasticized material 17 is discharged via the nozzle 18, the controller 7 moves the receiving plate 6 in the directions X and Y. The three-dimensional modeler 1 thus forms a layer having a predetermined pattern on the receiving plate 6. The layer is a first layer.

The elevation stage 8 then moves the molding unit 11 by a predetermined distance toward the positive side of the direction Z. The three-dimensional modeler 1 forms a second layer on top of the first layer. The three-dimensional modeler 1 further forms a third layer and subsequent layers on top of each other to form a three-dimensional structure 19.

Figure 2:
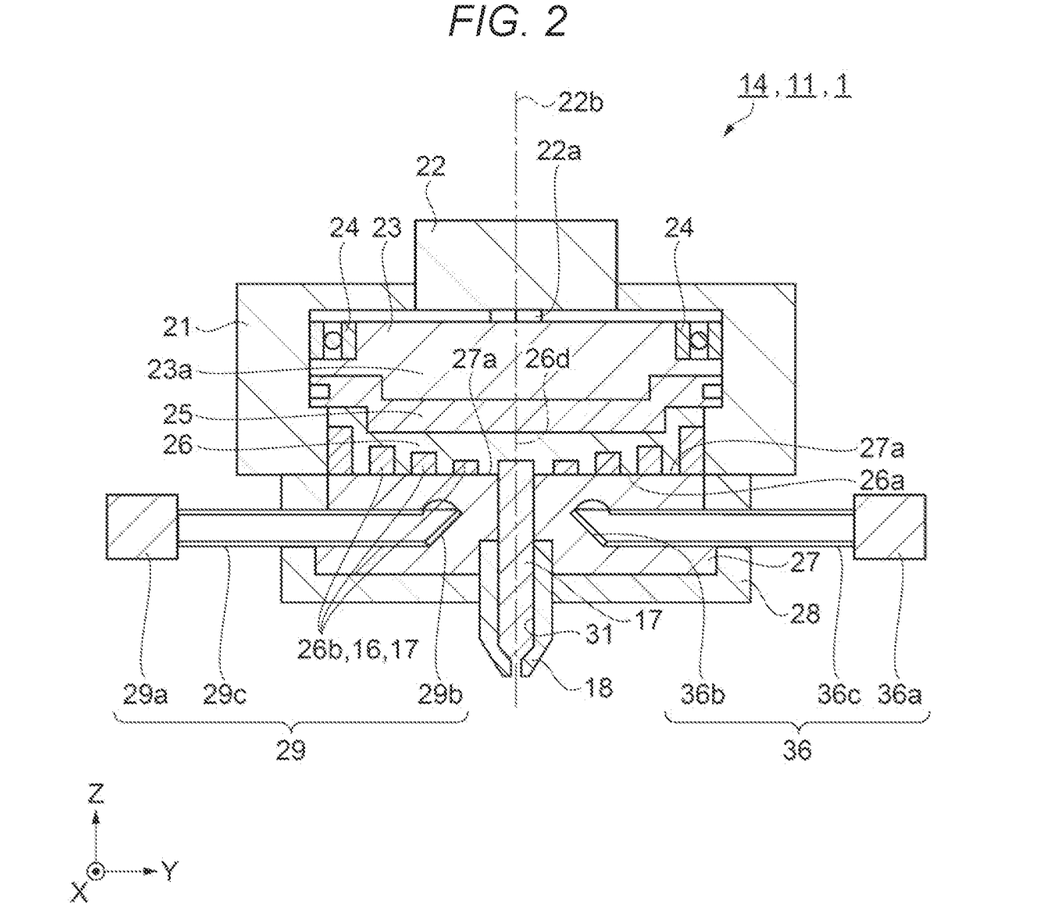
FIG. 2 is a diagrammatic side cross-sectional view showing the configuration of a plasticizer.

The plasticizer 14 includes a screw case 21, as shown in FIG. 2. The screw case 21 has a cavity provided therein. A drive motor 22 is disposed on a side of the screw case 21, the side facing the positive side of the direction Z. The controller 7 controls the rotational angle, rotational speed, rotation start timing, and rotation stop timing of the drive motor 22.

A speed reducer 23 is coupled to a rotary shaft 22a of the drive motor 22. When the rotary shaft 22a rotates at a high speed, the outer circumference of the speed reducer 23 rotates at a low, decelerated speed. The outer circumference of the speed reducer 23 rotates at a low speed and forms an output shaft 23a. A bearing 24 is disposed at the outer circumference of the speed reducer 23. The bearing 24 is disposed between the screw case 21 and the speed reducer 23. The bearing 24 rotatably supports the speed reducer 23.

A screw support 25 is disposed at the output shaft 23a of the speed reducer 23. A flat screw 26 is disposed at the screw support 25. The flat screw 26 is rotated by the drive motor 22. The flat screw 26 rotates in sync with the output shaft 23a. The flat screw 26 rotates around the rotary shaft 22a of the drive motor 22. A screw rotation center 26d, which is the center of rotation of the flat screw 26, coincides with a motor rotation center 22b, which is the center of rotation of the rotary shaft 22a of the drive motor 22.

Figure 3:
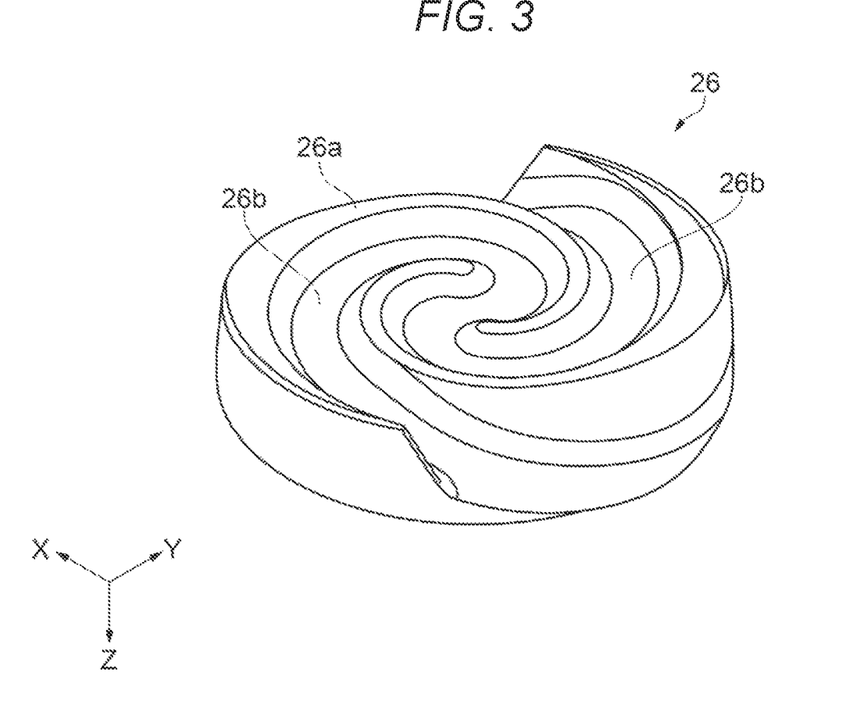
FIG. 3 is a schematic perspective view showing a flat screw.

The flat screw 26 has a groove forming surface 26a, where a spiral groove 26b is formed, as shown in FIGS. 2 and 3. The flat screw 26 has a substantially circular columnar shape the size of which in the direction of the rotary shaft 22a is smaller than the size of the shape in the direction perpendicular to the rotary shaft 22a. In the illustrated example, two grooves 26b are provided, but the number of grooves 26b is not limited to a specific number. Although not shown, three or more grooves 26b may be provided, or only one groove 26b may be provided.

The screw case 21 houses the speed reducer 23, the screw support 25, and the flat screw 26. The screw case 21 has a supply path 21a, which is coupled to the coupling tube 13, as shown in FIG. 1. The supply path 21a continuously extends from the coupling tube 13 to the flat screw 26. An opening of the supply path 21a, the opening on the side facing the flat screw 26, is a passage port 21b. The screw case 21 has the passage port 21b, via which the resin pellets 16 pass toward the flat screw 26.

A barrel 27 is disposed on a side of the flat screw 26, the side facing the negative side of the direction Z. A barrel case 28, which houses the barrel 27, is disposed on a side of the screw case 21, the side facing the negative side of the direction Z. The flat screw 26 rotates relative to the barrel 27.

The barrel 27 has a groove facing surface 27a, which faces the groove forming surface 26a, as shown in FIG. 2. The barrel 27 is formed of a transparent member. The transparent member is not necessarily made of a specific material and is made, for example, of quartz glass in the present embodiment. The transmittance of the barrel 27 at which the barrel 27 transmits visible light, infrared light, and light that belongs to other regions is preferably higher than or equal to 30% but lower than or equal to 100%. The transmittance of the barrel 27 is further preferably higher than or equal to 50% but lower than or equal to 100%.

A heater 29 is disposed in the barrel 27 at a location where the heater 29 faces the grooves 26b. The heater 29 is an infrared heater that heats the resin pellets 16 in a non-contact manner via the transparent member. The heater 29 includes a light source 29a, which emits infrared light, a first mirror 29b, and a first light guide tube 29c. The first light guide tube 29c guides the infrared light from the light source 29a to the first mirror 29b. The first mirror 29b changes the traveling direction of the infrared light toward a central portion of the flat screw 26. According to the configuration described above, the location irradiated with the infrared light outputted by the infrared heater is heated. The resin pellets 16 can therefore be locally heated.

The heater 29 heats the resin pellets 16 supplied to the space between the flat screw 26 and the barrel 27. In detail, the heater 29 heats the resin pellets 16 supplied to the space between the grove forming surface 26a and the groove facing surface 27a. The heated resin pellets 16 plasticize into the plasticized material 17. The barrel 27 is provided with a communication hole 31, via which the plasticized material 17, into which the resin pellets 16 have plasticized, flows.

The plasticizer 14 is configured to make the resin pellets 16 visible in the space between the flat screw 26 and the barrel 27 via the transparent member of the barrel 27.

According to the configuration described above, the resin pellets 16 move along the grooves 26b formed in the flat screw 26 toward the communication hole 31. The resin pellets 16 are heated in the course of their movement. The heated material thus plasticizes. The barrel 27 is formed of the transparent member. The material is visible through the barrel 27. The locations where the resin pellets 16 are solid and where the resin pellets 16 have plasticized in the grooves 26b can therefore be checked. The state of the plasticization in the flat screw 26 can therefore be checked.

A central portion of the barrel 27, the portion where the communication hole 31 is formed, is formed of a transparent member. According to the configuration described above, in which the central portion of the barrel 27 is formed of a transparent member, the state of the plasticization in the flat screw 26 can be checked through the central portion of the barrel 27.

Figure 4:
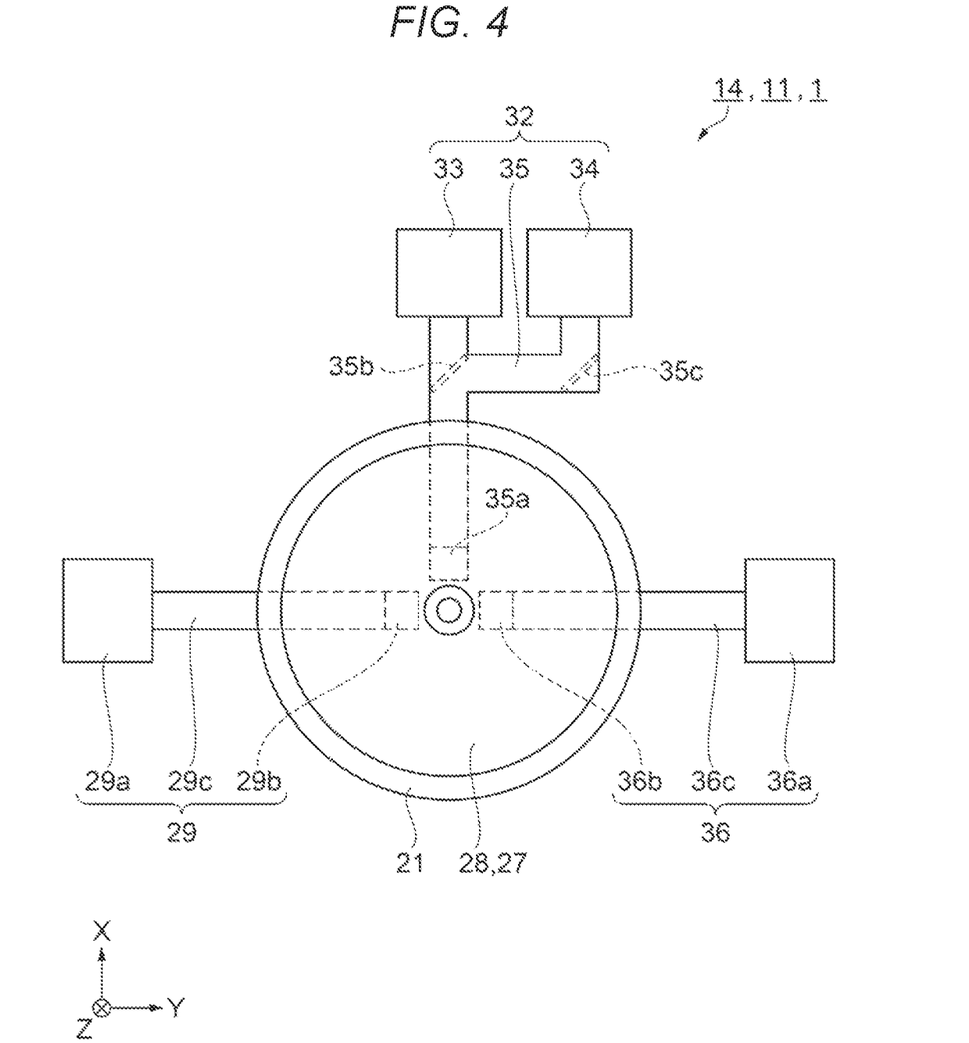
FIG. 4 is a diagrammatic plan view showing the configuration of a barrel.

The plasticizer 14 includes a detector 32, as shown in FIG. 4. The detector 32 includes an imaging camera 33, an infrared camera 34, and a second light guide tube 35. The second light guide tube 35 accommodates a second mirror 35a, a half-silvered mirror 35b, and a third mirror 35c.

The plasticizer 14 further includes an illuminator 36. The illuminator 36 includes a second light source 36a, a fourth mirror 36b, and a third light guide tube 36c. The illuminator 36 emits visible light. The third light guide tube 36c guides the visible light from the second light source 36a to the fourth mirror 36b. The fourth mirror 36b changes the traveling direction of the visible light toward the central portion of the flat screw 26. The visible light passes through the transparent member of the barrel 27 and is radiated to the central portion of the flat screw 26.

In the flat screw 26, the resin pellets 16 and the plasticized material 17 flow in the grooves 26b. The visible light is radiated to the grooves 26b, the resin pellets 16, and the plasticized material 17. Part of the visible light is reflected off the grooves 26b, the resin pellets 16, and the plasticized material 17. Part of the reflected visible light is reflected off the second mirror 35a, passes through the half mirror 35b, and enters the imaging camera 33. The imaging camera 33 captures an image of the grooves 26b, the resin pellets 16, and the plasticized material 17. When the resin pellets 16 plasticize, the contours of the resin pellets 16 are unlikely to be seen, and the imaging camera 33 can be used to observe the plasticization state of the resin pellets 16.

The heater 29 radiates infrared light to the grooves 26b, the resin pellets 16, and the plasticized material 17. When heated, the grooves 26b, the resin pellets 16, and the plasticized material 17 emit infrared light. Part of the infrared light emitted by the grooves 26b, the resin pellets 16, and the plasticized material 17 is reflected off the second mirror 35a, the half-silvered mirror 35b, and the third mirror 35c and enters the infrared camera 34. The infrared camera 34 captures an image of the grooves 26b, the resin pellets 16, and the plasticized material 17. The infrared camera 34 is a two-dimensional sensor. The infrared camera 34 captures the distribution of the temperatures of the grooves 26b, the resin pellets 16, and the plasticized material 17. When the temperature of the resin pellets 16 rises, the resin pellets 16 plasticize, whereby detection of the temperature of the resin pellets 16 allows observation of the plasticization state of the resin pellets 16.

The detector 32 detects the plasticization state of the resin pellets 16 in the space between the flat screw 26 and the barrel 27 via the transparent member of the barrel 27. According to the configuration described above, the detector 32 detects the plasticization state of the resin pellets 16. The plasticization state of the resin pellets 16 can therefore be monitored without human intervention. In a case where the detector 32 is not provided, a person may monitor the plasticization state of the resin pellets 16.

Figure 5:
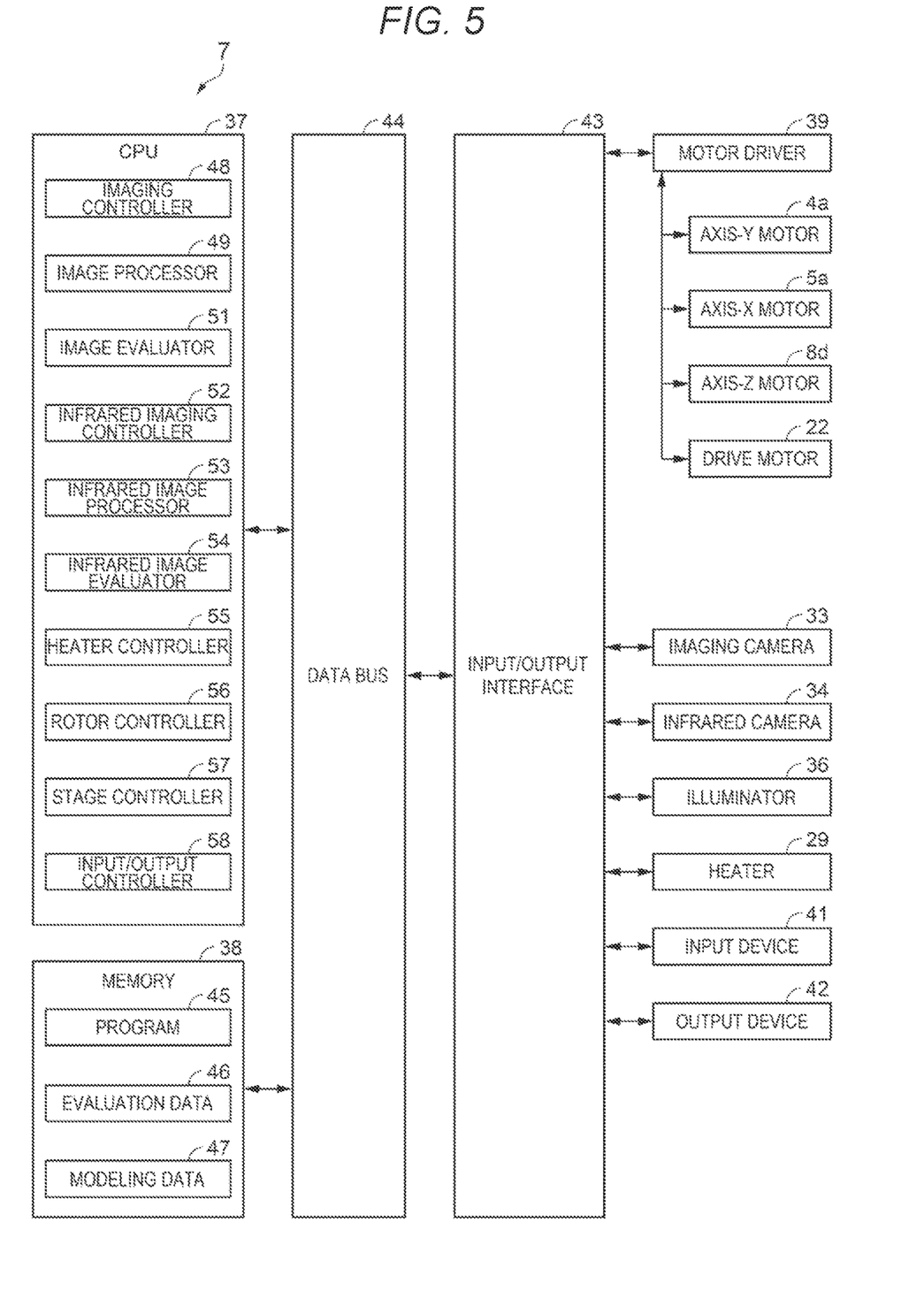
FIG. 5 is an electrical block diagram of the three-dimensional modeler.

The controller 7 includes a CPU 37 (central processing unit), which performs a variety of types of computation, and a memory 38, which stores a variety of pieces of information, as shown in FIG. 5. A motor driver 39, the imaging camera 33, the infrared camera 34, the illuminator 36, the heater 29, an input device 41, and an output device 42 are coupled to the CPU 37 via an input/output interface 43 and a data bus 44.

The motor driver 39 drives the axis-Y motor 4a, the axis-X motor 5a, the axis-Z motor 8d, and the drive motor 22. The motor driver 39 receives instruction signals as input from the CPU 37 and drives the axis-Y motor 4a, the axis-X motor 5*a*, the axis-Z motor 8*d*, and the drive motor 22 in such a way that the states indicated by the instruction signals are achieved.

The input device 41 is a keyboard, joystick, or any other device. An operator operates the input device 41 to input a variety of instructions.

The output device 42 is a display device, an external output device, or any other device. The operator checks a variety of pieces of information by looking at the display device. The output device 42 includes an external interface that communicates with an external apparatus.

The memory 38 is formed of a semiconductor memory, such as a RAM (random access memory) and a ROM (read only memory). The memory 38 stores a program 45, which describes the procedure in accordance with which the three-dimensional modeler 1 operates. The memory 38 further stores evaluation data 46, based on which the plasticization state of the resin pellets 16 is evaluated. The memory 38 still further stores modeling data 47. The molding data 47 is data representing the procedure in accordance with which the stage 3 and the elevation stage 8 are moved to mold a structural object. Furthermore, the memory 38 has a work area where the CPU 37 operates, a storage area that functions, for example, as a temporary file, and a variety of other storage areas.

The CPU 37 drives the three-dimensional modeler 1 in accordance with the program 45 stored in the memory 38. The CPU 37, on which the program 45 runs, includes an imaging controller 48 as a specific function achieving section. The imaging controller 48 controls the timing at which the imaging camera 33 captures an image.

The CPU 37 further includes an image processor 49 as a detector. The image processor 49 performs image processing on the image captured by the imaging camera 33. The image processor 49 detects the number of resin pellets 16 identified in a predetermined area of the groove forming surface 26*a* of the flat screw 26. When there are a large number of the resin pellets 16 identified in the predetermined area, the plasticization state indicates that the plasticization slowly progresses. When there are a small number of the resin pellets 16 identified in the predetermined area, the plasticization state indicates that the plasticization quickly progresses. The image processor 49 is part of the detector 32. The detector 32 detects the plasticization state of the resin pellets 16.

The CPU 37 further includes an image evaluator 51. The image evaluator 51 compares the plasticization state detected by the image processor 49 with the evaluation data 46.

The CPU 37 further includes an infrared imaging controller 52. The infrared imaging controller 52 controls the timing at which the infrared camera 34 captures an image.

The CPU 37 further includes an infrared image processer 53 as the detector. The infrared image processor 53 performs image processing on the image captured by the infrared camera 34. The infrared image processor 53 detects the distribution of the temperatures of the resin pellets 16 and the plasticized material 17 in the predetermined area of the groove forming surface 26*a* of the flat screw 26. When the resin pellets 16 and the plasticized material 17 identified in the predetermined area have low temperatures, the plasticization state indicates that the plasticization slowly progresses. When the resin pellets 16 and the plasticized material 17 identified in the predetermined area have high temperatures, the plasticization state indicates that the plasticization quickly progresses. The infrared image processor 53 is part of the detector 32. The detector 32 detects the plasticization state of the resin pellets 16.

The CPU 37 further includes an infrared image evaluator 54. The infrared image evaluator 54 compares the plasticization state detected by the infrared image processor 53 with the evaluation data 46.

The CPU 37 further includes a heater controller 55. The heater controller 55 controls the intensity of the infrared light emitted by the heater 29.

The CPU 37 further includes a rotor controller 56. The rotor controller 56 controls the rotational speed of the flat screw 26 by controlling the rotational speed of the drive motor 22.

The CPU 37 further includes a stage controller 57. The stage controller 57 outputs instruction signals to the motor driver 39 to control the axis-Y motor 4*a*, the axis-X motor 5*a*, and the axis-Z motor 8*d*.

The CPU 37 further includes an input/output controller 58. The input/output controller 58 accepts information inputted to the input device 41. The input/output controller 58 transmits the information to a functional achieving section relating to the accepted information. The input/output controller 58 outputs the information to the output device 42. The input/output controller 58 outputs an instruction signal that instructs display or transmission of the information to the output device 42.

Figure 6:
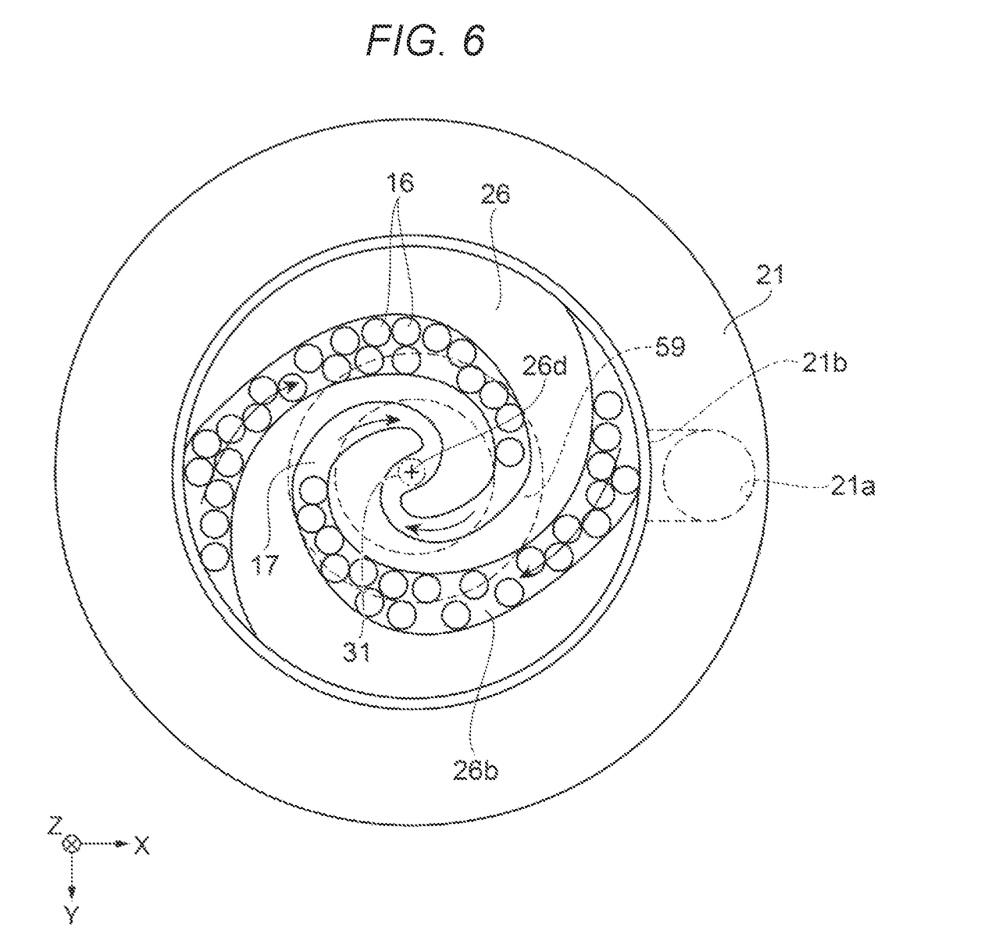
FIG. 6 is a diagrammatic plan view of the flat screw for describing changes in resin pellets.

The flat screw 26 rotates relative to the barrel 27, as shown in FIG. 6. The resin pellets 16 flow via the passage port 21*b* to the grooves 26*b* of the flat screw 26. The resin pellets 16 flowing along the grooves 26*b* are heated by the heater 29. The resin pellets 16 are plasticized in the middle of their flow toward the screw rotation center 26*d*. The plasticized resin pellets 16 become the plasticized material 17. The plasticized material 17 passes through the communication hole 31 toward the nozzle 18.

The image captured by the imaging camera 33 shows the contours of the resin pellets 16, but does not show the contour of the plasticized material 17. An annular evaluation area 59 around the screw rotation center 26*d* is set in the image captured by the imaging camera 33.

The evaluation area 59 is an area where part of the resin pellets 16 is transformed into the plasticized material 17. The image processor 49 detects the number of resin pellets 16 the contours of which are visible in the evaluation area 59. The number of resin pellets 16 at this point is a detected number. The evaluation data 46 contains the number set as an evaluation upper limit and the number set as an evaluation lower limit. The image evaluator 51 compares the number set as an evaluation upper limit and the number set as an evaluation lower limit with the detected number.

When the detected number is greater than the number set as an evaluation upper limit, the image evaluator 51 determines that the slow plasticization is underway. The image evaluator 51 then outputs an instruction signal to the heater controller 55 to cause it to increase the amount of heat generated by the heater 29. The temperature of the heater 29 rises. The image evaluator 51 outputs an instruction signal to the rotor controller 56 to cause it to reduce the rotational speed of the flat screw 26. The control described above causes the resin pellets 16 to be further heated in the grooves 26*b*. The number detected in the evaluation area 59 decreases.

When the detected number is smaller than the number set as an evaluation lower limit, the image evaluator 51 determines that the quick plasticization is underway. The image evaluator 51 then outputs an instruction signal to the heater controller 55 to cause it to reduce the amount of heat generated by the heater 29. The temperature of the heater 29 lowers. The image evaluator 51 outputs an instruction signal to the rotor controller 56 to cause it to increase the rotational speed of the flat screw 26. The control described above causes the resin pellets 16 to be heated by a smaller degree in the grooves 26b. The number detected in the evaluation area 59 increases.

When the detected number is between the number set as an evaluation upper limit and the number set as an evaluation lower limit, the image evaluator 51 outputs an instruction signal to the heater controller 55 to cause it to maintain the amount of heat generated by the heater 29. The image evaluator 51 outputs an instruction signal to the rotor controller 56 to cause it to maintain the rotational speed of the flat screw 26. The control described above maintains the condition under which the resin pellets 16 are heated in the grooves 26b. The number detected in the evaluation area 59 is maintained.

Note that the image evaluator 51 may control only the rotational speed of the flat screw 26. The image evaluator 51 may instead control only the temperature of the heater 29.

The infrared image evaluator 54 detects the temperatures of the resin pellets 16 and the plasticized material 17 in the evaluation area 59. The temperatures of the resin pellets 16 and the plasticized material 17 are each a detected temperature. The evaluation data 46 contains a temperature set as an evaluation upper limit and a temperature set as an evaluation lower limit. The infrared image evaluator 54 compares the temperature set as an evaluation upper limit and the temperature set as an evaluation lower limit with the detected temperatures.

When the detected temperature is lower than the temperature set as an evaluation lower limit, the infrared image evaluator 54 determines that the slow plasticization is underway. The infrared image evaluator 54 then outputs an instruction signal to the heater controller 55 to cause it to increase the amount of heat generated by the heater 29. The temperature of the heater 29 rises. The infrared image evaluator 54 outputs an instruction signal to the rotor controller 56 to cause it to reduce the rotational speed of the flat screw 26. The control described above causes the resin pellets 16 to be further heated in the grooves 26b. The temperature detected in the evaluation area 59 rises.

When the detected temperature is higher than the temperature set as an evaluation upper limit, the infrared image evaluator 54 determines that the quick plasticization is underway. The infrared image evaluator 54 then outputs an instruction signal to the heater controller 55 to cause it to reduce the amount of heat generated by the heater 29. The temperature of the heater 29 lowers. The infrared image evaluator 54 outputs an instruction signal to the rotor controller 56 to cause it to increase the rotational speed of the flat screw 26. The control described above causes the resin pellets 16 to be heated by a smaller degree in the grooves 26b. The temperature detected in the evaluation area 59 lowers.

When the detected temperature is between the temperature set as an evaluation upper limit and the temperature set as an evaluation lower limit, the infrared image evaluator 54 outputs an instruction signal to the heater controller 55 to cause it to maintain the amount of heat generated by the heater 29. The infrared image evaluator 54 outputs an instruction signal to the rotor controller 56 to cause it to maintain the rotational speed of the flat screw 26. The control described above maintains the condition under which the resin pellets 16 are heated in the grooves 26b. The temperature detected in the evaluation area 59 is maintained.

Note that the infrared image evaluator 54 may control only the rotational speed of the flat screw 26. The infrared image evaluator 54 may instead control only the temperature of the heater 29.

In accordance with the plasticization state of the resin pellets 16 that is detected by the detector 32, the controller 7 controls at least one of the rotational speed of the flat screw 26 and the temperature of the heater 29.

According to the configuration described above, the controller 7 reduces the rotational speed of the flat screw 26 when the location where the resin pellets 16 are plasticized from the solid state is close to the communication hole 31. The controller instead raises the temperature of the heater 29. When the location where the resin pellets 16 are plasticized from the solid state is far away from the communication hole 31, the controller 7 increases the rotational speed of the flat screw 26. The controller 7 instead lowers the temperature of the heater 29. The controller 7 thus controls at least one of the rotational speed of the flat screw 26 and the temperature of the heater 29 to achieve an appropriate plasticization state of the material.

Figure 7:
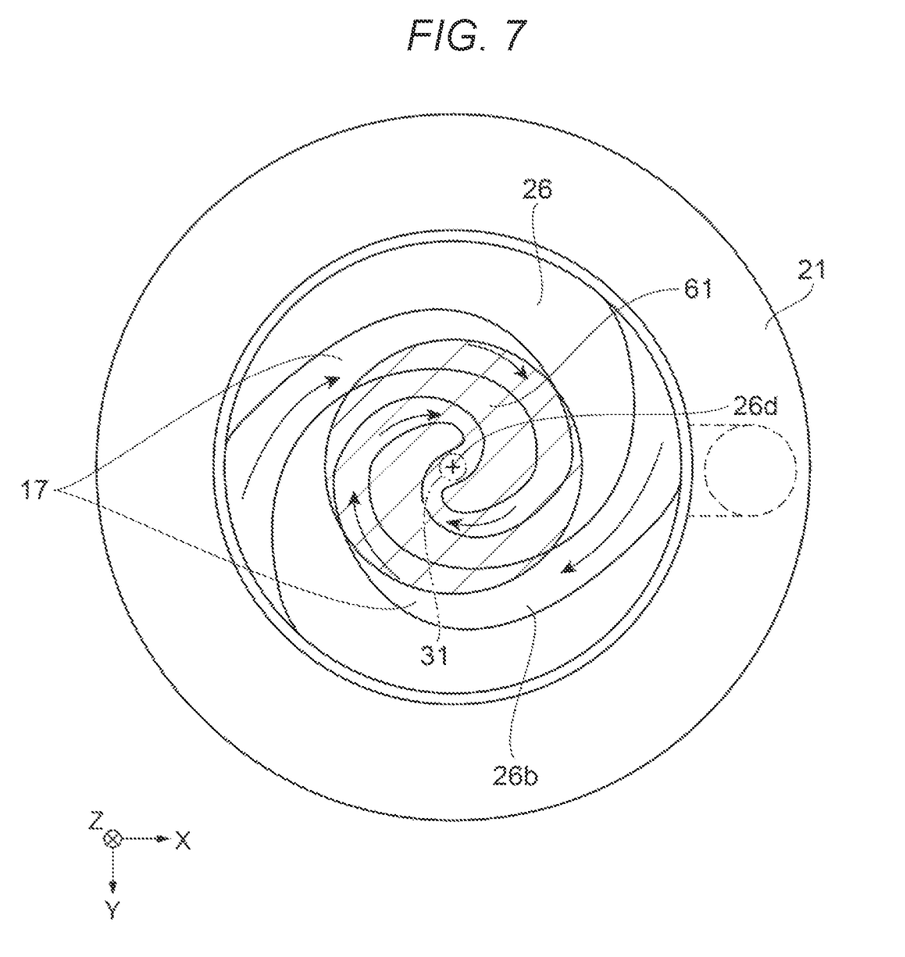
FIG. 7 is a diagrammatic plan view of the flat screw for describing the range over which a heater radiates infrared light.

The hatched area in FIG. 7 is a heated area 61. The heated area 61 is the area heated by the heater 29. The heated area 61 heated by the heater 29 has a circular shape. The configuration described above, in which the heated area 61 has a circular shape, can achieve a temperature distribution with a higher temperature at the center. The resin pellets 16 closer to the communication hole 31 are more likely to be plasticized.

According to the configuration described above, the three-dimensional modeler 1 includes the plasticizer 14 described above. The plasticizer 14 described above allows checking of the plasticization state of the resin pellets 16 in the flat screw 26. The three-dimensional modeler 1 can therefore be an apparatus including the plasticizer 14, which allows checking of the plasticization state of the resin pellets 16 in the flat screw 26.

Second Embodiment

The present embodiment differs from the first embodiment in that the flat screw and the barrel are each formed of a transparent member. The same configurations as those in the first embodiment have the same reference characters, and no redundant description of the same configurations will be made.

Figure 8:
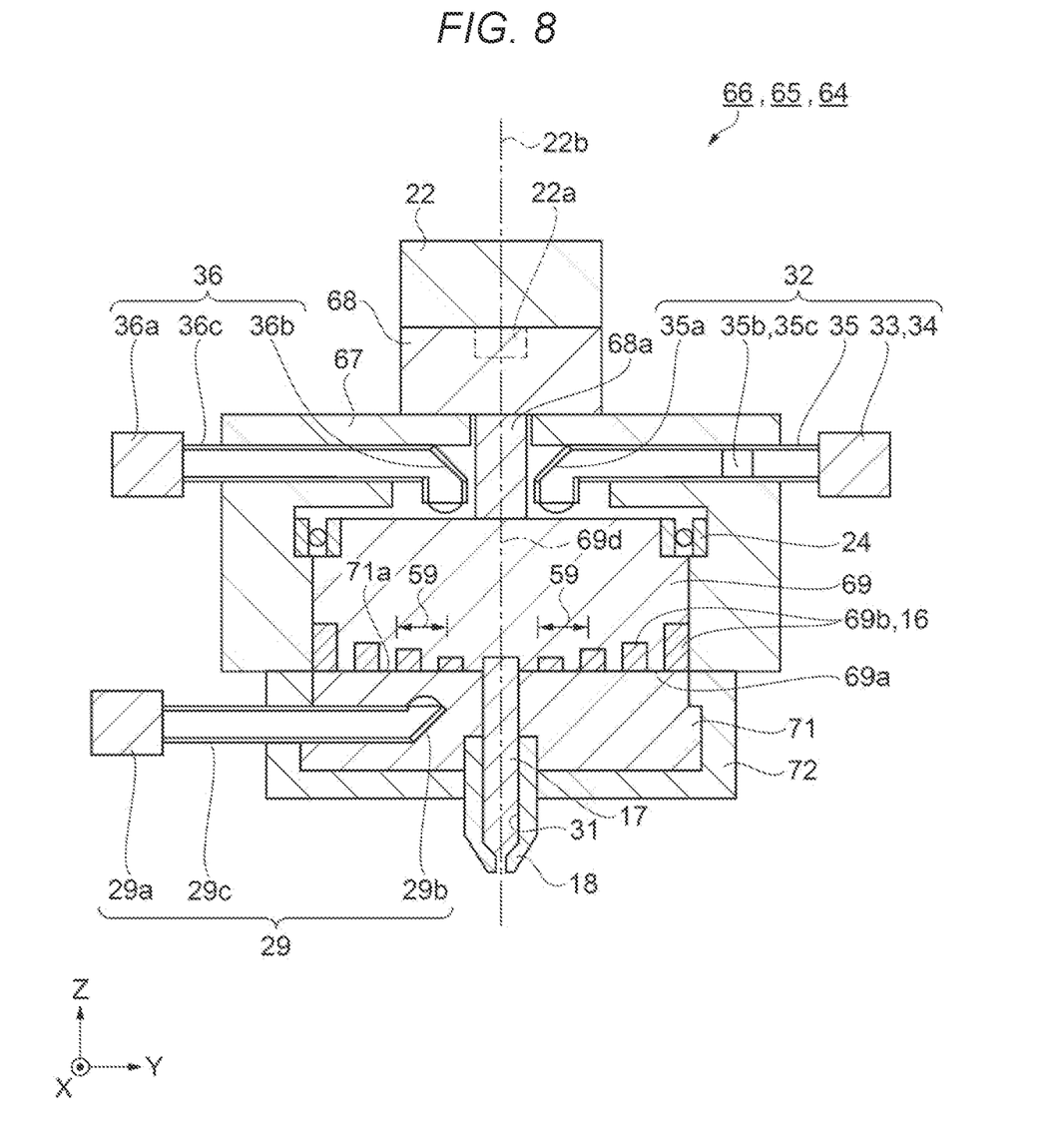
FIG. 8 is a diagrammatic side cross-sectional view showing the configuration of a plasticizer according to a second embodiment.

A plasticizer 66 in a molding unit 65 of a three-dimensional modeler 64 includes a screw case 67, as shown in FIG. 8. The screw case 67 has a cavity provided therein. The drive motor 22 and a speed reducer 68 are disposed on a side of the screw case 67, the side facing the positive side of the direction Z. The speed reducer 68 is coupled to the rotary shaft 22a of the drive motor 22. When the rotary shaft 22a rotates at high speed, an output shaft 68a of the speed reducer 68 rotates at a low, decelerated speed.

A flat screw 69 is disposed at the output shaft 68a of the speed reducer 68. The flat screw 69 is rotated by the drive motor 22. The flat screw 69 rotates in sync with the output shaft 68a. The flat screw 69 rotates around the rotary shaft 22a of the drive motor 22. A screw rotation center 69d, which is the center of rotation of the flat screw 69, coincides with the motor rotation center 22b, which is the center of rotation of the rotary shaft 22a of the drive motor 22.

The bearing 24 is disposed at the outer circumference of the flat screw 69. The bearing 24 is disposed between the screw case 67 and the flat screw 69. The bearing 24 rotatably supports the flat screw 69.

The flat screw 69 has a groove forming surface 69a, where spiral grooves 69b are formed. The flat screw 69 has a substantially circular columnar shape the size of which in the direction of the rotary shaft 22a is smaller than the size of the shape in the direction perpendicular to the rotary shaft 22a.

The detection unit 32 and the illuminator 36 are disposed between the speed reducer 68 and the flat screw 69. The screw case 67 houses the flat screw 69, the detector 32, and the illuminator 36.

A barrel 71 is disposed on a side of the flat screw 69, the side facing the negative side of the direction Z. A barrel case 72, which houses the barrel 71, is disposed on a side of the screw case 67, the side facing the negative side of the direction Z. The flat screw 69 rotates relative to the barrel 71.

The flat screw 69 is formed of a transparent member and configured to make the resin pellets 16 visible in the space between the flat screw 69 and the barrel 71 via the transparent member. The illuminator 36 radiates visible light to the grooves 69b through the transparent member of the flat screw 69. The imaging camera 33 of the detector 32 captures an image of the resin pellets 16 and the plasticized material 17 in the grooves 69b.

The barrel 71 has a groove facing surface 71a, which faces the groove forming surface 69a. The barrel 71 is formed of a transparent member. Each of the transparent members of the flat screw 69 and the barrel 71 is not necessarily made of a specific material and is made, for example, of quartz glass in the present embodiment. The transmittance of the flat screw 69 and the barrel 71 is preferably higher than or equal to 30% but lower than or equal to 100%. The transmittance of the flat screw 69 and the barrel 71 is further preferably higher than or equal to 50% but lower than or equal to 100%.

The heater 29 is disposed in the barrel 71 at a location where the heater 29 faces the grooves 69b. The heater 29 is an infrared heater that heats the resin pellets 16 in a non-contact manner via the transparent member. The heater 29 includes the light source 29a, which emits infrared light, and the first mirror 29b. The first mirror 29b changes the traveling direction of the infrared light toward a central portion of the flat screw 69.

The heater 29 heats the resin pellets 16 supplied to the space between the flat screw 69 and the barrel 71. In detail, the heater 29 heats the resin pellets 16 supplied to the space between the groove forming surface 69a and the groove facing surface 71a. The heated resin pellets 16 plasticize into the plasticized material 17. The barrel 71 is provided with the communication hole 31, via which the plasticized material 17, into which the resin pellets 16 have been plasticized, flows.

The plasticizer 66 is configured to make the resin pellets 16 visible in the space between the flat screw 69 and the barrel 71 via the transparent member of the flat screw 69.

According to the configuration described above, the resin pellets 16 move along the grooves 69b formed in the flat screw 69 toward the communication hole 31. The resin pellets 16 are heated in the course of their movement. The heated resin pellets 16 plasticize. The flat screw 69 is formed of a transparent member. The resin pellets 16 are visible through the flat screw 69. The locations where the resin pellets 16 are solid and where the resin pellets 16 have plasticized in the groove 69b can therefore be checked. The state of the plasticization in the flat screw 69 can therefore be checked.

The flat screw 69 and the barrel 71 are each formed entirely of a transparent member. Portions of the flat screw 69 and the barrel 71, the portions outside of the evaluation area 59, may be made of opaque metal. At least a portion of each of the flat screw 69 and the barrel 71 only needs to be formed of a transparent member. The portion is the area where the detector 32 can detect the evaluation area 59. The configuration described above allows the detector 32 to detect the plasticization state of the resin pellets 16 in the evaluation area 59.

The central portion of the flat screw 69, the portion facing a central portion of the barrel 71, is formed of a transparent member. According to the configuration described above, in which the central portion of flat screw 69 is formed of a transparent member, the state of the plasticization in the flat screw 69 can be checked through the central portion of the flat screw 69.

Third Embodiment

The present embodiment differs from the second embodiment in that the barrel is formed of an opaque material. The same configurations as those in the first embodiment have the same reference characters, and no redundant description of the same configurations will be made.

Figure 9:
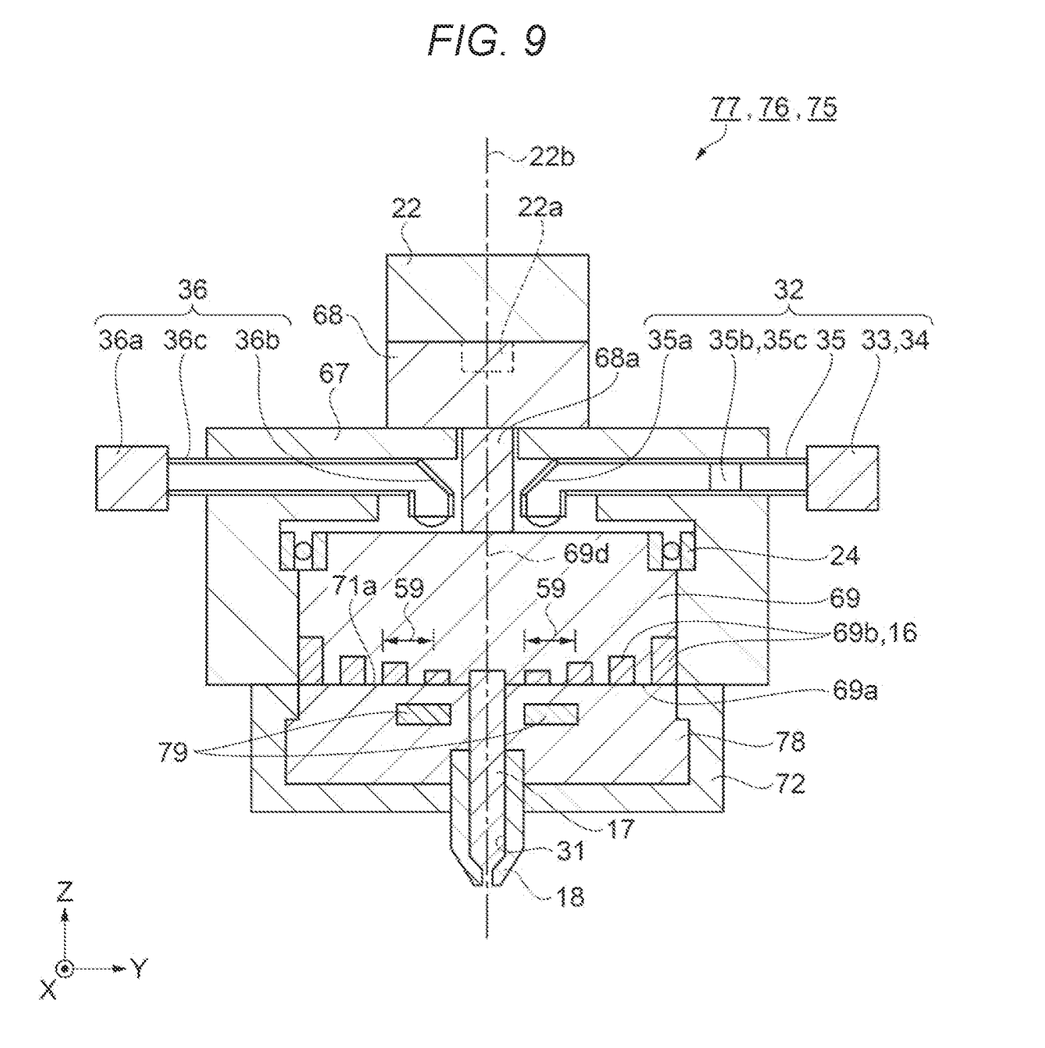
FIG. 9 is a diagrammatic side cross-sectional view showing the configuration of a plasticizer according to a third embodiment.

A plasticizer 77 in a molding unit 76 of a three-dimensional modeler 75 includes a barrel 78, as shown in FIG. 9. The barrel 78 is made of opaque metal. The barrel 78 is not necessarily made of a specific material and is made, for example, of stainless steel in the present embodiment. A heater 79 is disposed in the barrel 78. The heater 79 is a ceramic heater including a heating wire in a ceramic tube. The heater 79 is disposed in an annular shape around the communication hole 31. The heater 79 heats the central portion of the flat screw 69. The heater 79 heats the resin pellets 16 supplied to the space between the flat screw 69 and the barrel 78. The heater 79 heats the resin pellets 16 and the plasticized material 17 flowing along the grooves 69b of the flat screw 69.

In the plasticizer 77, at least part of the flat screw 69 is formed of a transparent member. The plasticizer 77 is configured to make the resin pellets 16 visible in the space between the flat screw 69 and the barrel 78 via the transparent member. The configuration described above allows checking of the locations where the resin pellets 16 are solid and where the resin pellets 16 have plasticized in the grooves 69b, as in the second embodiment. The state of the plasticization in the flat screw 69 can therefore be checked.

Fourth Embodiment

The present embodiment differs from the first embodiment in that the flat screw is replaced with an in-line screw. The same configurations as those in the first embodiment have the same reference characters, and no redundant description of the same configurations will be made.

Figure 10:
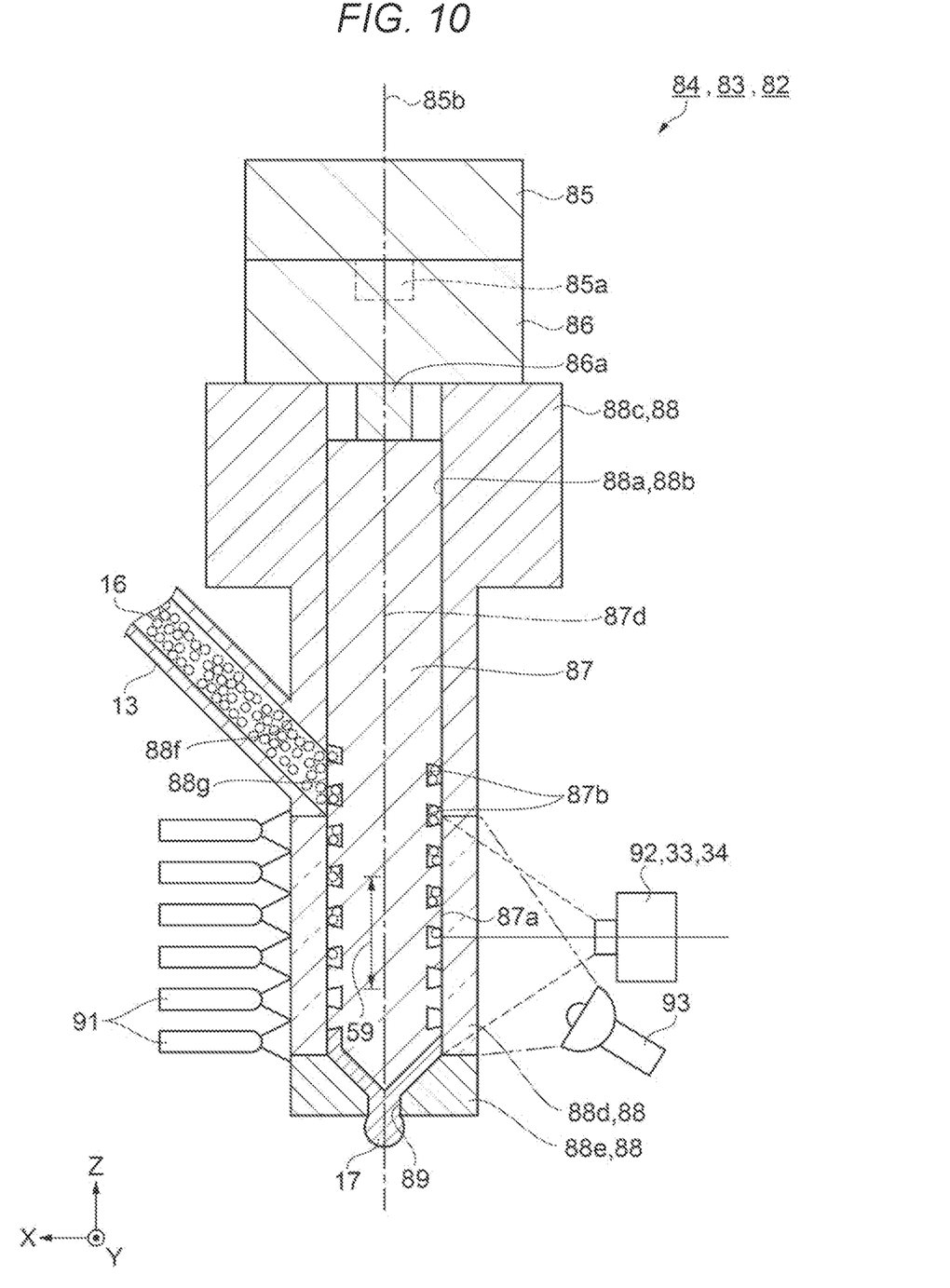
FIG. 10 is a diagrammatic side cross-sectional view showing the configuration of a plasticizer according to a fourth embodiment.

A plasticizer 84 in a molding unit 83 of a three-dimensional modeler 82 includes a drive motor 85, as shown in FIG. 10. A speed reducer 86 is coupled to a rotary shaft 85a of the drive motor 85. When the rotary shaft 85a rotates at a high speed, an output shaft 86a of the speed reducer 86 rotates at a low, decelerated speed.

An in-line screw 87 is disposed at the output shaft 86a of the speed reducer 86. The in-line screw 87 is rotated by the drive motor 85. The in-line screw 87 rotates in sync with the output shaft 86a. The in-line screw 87 rotates around the rotary shaft 85a of the drive motor 85. A screw rotation center 87d, which is the center of rotation of the in-line screw 87, coincides with a motor rotation center 85b, which is the center of rotation of the rotary shaft 85a of the drive motor 85.

The in-line screw 87 has a groove forming surface 87a, where spiral grooves 87b are formed. The in-line screw 87 has a substantially circular columnar shape the size of which in the direction of the rotary shaft 85a is greater than the size of the shape in the direction perpendicular to the rotary shaft 85a.

A barrel 88 is disposed on a side of the speed reducer 86, the side facing the negative side of the direction Z. The barrel 88 has a hole 88b coaxial with the screw rotation center 87d. The in-line screw 87 is inserted into the hole 88b. The barrel 88 is formed of a first barrel 88c on the side facing the positive side of the direction Z, a second barrel 88d, which is a central barrel, and a third barrel 88e on the side facing the negative side of the direction Z. The side surface of the hole 88b is a groove facing surface 88a, which faces the groove forming surface 87a. The barrel 88 has the groove facing surface 88a, which faces the groove forming surface 87a. A communication hole 89, which is coaxial with the screw rotation center 87d, is formed in the third barrel 88e.

The barrel 88 has a supply path 88f coupled to the coupling tube 13. The supply path 88f continuously extends from the coupling tube 13 to the in-line screw 87. An opening of the supply path 88f, the opening on the side facing the in-line screw 87, is a passage port 88g. The barrel 88 has the passage port 88g, via which the resin pellets 16 pass toward the in-line screw 87. The in-line screw 87 rotates relative to the barrel 88.

The second barrel 88d is formed of a transparent member. The first barrel 88c and the third barrel 88e may each be a transparent or opaque member. At least part of the barrel 88 is formed of a transparent member. The transparent member is not necessarily made of a specific material and is made, for example, of quartz glass in the present embodiment. The transmittance of the second barrel 88d is preferably higher than or equal to 30% but lower than or equal to 100%. The transmittance of the second barrel 88d is further preferably higher than or equal to 50% but lower than or equal to 100%.

Heaters 91 are disposed on a side of the barrel 88, the side facing the positive side of the direction X, at a location where the heaters 91 face the grooves 87b. The heaters 91 heat the resin pellets 16 supplied to the space between the in-line screw 87 and the barrel 88. The heaters 91 are each an infrared heater that heats the resin pellets 16 in a non-contact manner via the transparent member. The heaters 91 radiate infrared light to the resin pellets 16 via the transparent member. According to the configuration described above, the location irradiated with the infrared light outputted by the infrared heaters is heated. The resin pellets 16 can therefore be locally heated.

The heated resin pellets 16 plasticize into the plasticized material 17. The plasticized material 17, into which the resin pellets 16 have plasticized, flows out of the plasticizer 84 via the communication hole 89.

The plasticizer 84 is configured to make the resin pellets 16 visible in the space between the in-line screw 87 and the barrel 88 via the transparent member of the barrel 88.

According to the configuration described above, the resin pellets 16 move along the grooves 87b formed in the in-line screw 87 toward the communication hole 89. The resin pellets 16 are heated in the course of their movement. The heated resin pellets 16 plasticize. At least part of the barrel 88 is formed of a transparent member. The resin pellets 16 are visible through the barrel 88. The locations where the resin pellets 16 are solid and where the resin pellets 16 have plasticized in the grooves 87b can therefore be checked. The state of plasticization in the in-line screw 87 can therefore be checked.

The plasticizer 84 includes a detector 92 and an illuminator 93 on a side of the second barrel 88d, the side facing the negative side of the direction X. The detector 92 includes the imaging camera 33 and the infrared camera 34.

The illuminator 93 emits visible light. The illuminator 93 radiates the visible light to the resin pellets 16 in the grooves 87b via the transparent member of the second barrel 88d. The detector 92 detects the plasticization state of the resin pellets 16 in the grooves 87b. A central portion of the second barrel 88d in the direction Z is the evaluation area 59.

In the in-line screw 87, the resin pellets 16 and the plasticizing material 17 flow in the grooves 87b. The visible light is radiated to the grooves 87b, the resin pellets 16, and the plasticized material 17. Part of the visible light is reflected off the grooves 87b, the resin pellets 16, and the plasticized material 17. The reflected visible light enters the imaging camera 33. The imaging camera 33 captures an image of the grooves 87b, the resin pellets 16, and the plasticized material 17. When the resin pellets 16 plasticize, the contours of the resin pellets 16 are unlikely to be seen, and the imaging camera 33 can be used to observe the plasticization state of the resin pellets 16.

The heaters 91 radiate infrared light to the grooves 87b, the resin pellets 16, and the plasticized material 17. When heated, the grooves 87b, the resin pellets 16, and the plasticized material 17 emit infrared light. Part of the infrared light emitted by the grooves 87b, the resin pellets 16, and the plasticized material 17 enters the infrared camera 34. The infrared camera 34 captures an image of the grooves 87b, the resin pellets 16, and the plasticized material 17. The infrared camera 34 is a two-dimensional sensor. The infrared camera 34 captures the distribution of the temperatures of the grooves 87b, the resin pellets 16, and the plasticized material 17. When the temperature of the resin pellets 16 rises, the resin pellets 16 plasticize, whereby detection of the temperature of the resin pellets 16 allows observation of the plasticization state of the resin pellets 16.

The detector 92 detects the plasticization state of the resin pellets 16 in the space between the in-line screw 87 and the barrel 88 via the transparent member of the barrel 88. According to the configuration described above, the detector 92 detects the plasticization state of the resin pellets 16. The plasticization state of the resin pellets 16 can therefore be monitored without human intervention. In a case where the detector 92 is not provided, a person may monitor the plasticization state of the resin pellets 16.

Fifth Embodiment

The present embodiment introduces an example of an injection molder including any of the plasticizer 14 according to the first embodiment, the plasticizer 66 according to the second embodiment, the plasticizer 77 according to the third embodiment, and the plasticizer 84 according to the fourth embodiment.

Figure 11:
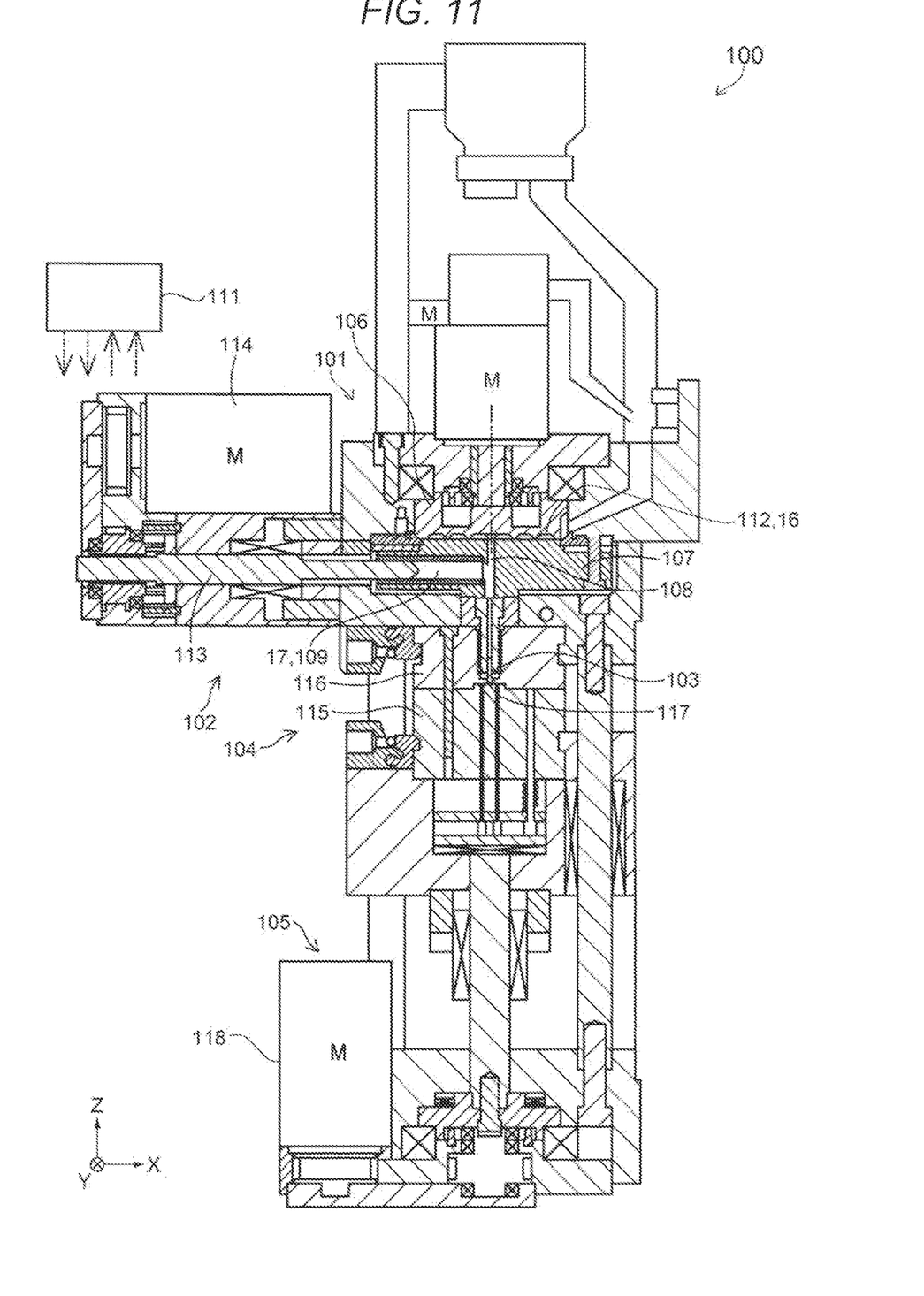
FIG. 11 is a diagrammatic side cross-sectional view showing the configuration of an injection molder according to a fifth embodiment.

The injection molder 100 includes a plasticizer 101, an injection control mechanism 102, a nozzle 103, a molding die 104, and a die clamper 105, as shown in FIG. 11. The plasticizer 101 is any of the plasticizer 14 according to the first embodiment, the plasticizer 66 according to the second embodiment, the plasticizer 77 according to the third embodiment, and the plasticizer 84 according to the fourth embodiment.

The plasticizer 101 includes a flat screw 106 and a barrel 107. An injection cylinder 109 is coupled to a communication hole 108 of the barrel 107. The plasticizer 101 plasticizes the resin pellets 16 supplied into grooves 112 of the flat screw 106 to produce the flowable paste-like plasticized material 17 and guides the plasticized material 17 via the communication hole 108 to the injection control mechanism 102 under the control of a controller 111.

The injection control mechanism 102 includes the injection cylinder 109, a plunger 113, and a plunger driver 114. The injection control mechanism 102 injects the plasticized material 17 in the injection cylinder 109 into a cavity 117. The injection control mechanism 102 controls the amount of plasticized material 17 injected via the nozzle 103 under the control of the controller 111. The injection cylinder 109 is a substantially cylindrical member coupled to the communication hole 108 of the barrel 107 and accommodates the plunger 113. The plunger 113 slides through the interior of the injection cylinder 109 and delivers under pressure the plasticized material 17 in the injection cylinder 109 to the nozzle 103 coupled to the plasticizer 101. The plunger 113 is driven by the plunger drive unit 114, which is formed of a motor.

The molding die 104 includes a movable die 115 and a fixed die 116. The movable die 115 and the fixed die 116 are so provided as to face each other, and the cavity 117, which is a space according to the shape of a product to be molded, is formed between the two dies. The plasticized material 17 delivered under pressure by the injection control mechanism 102 is injected into the cavity 117 via the nozzle 103.

The die clamper 105 includes a die driver 118. The die driver 118 causes the movable die 115 and the fixed die 116 to be in contact with each other and separates them from each other. The die clamper 105 drives the die driver 118 to move the movable die 115 under the control of the controller 111 to cause the movable die 115 and the fixed die 116 to be in contact with each other and separate them from each other.

In the injection molder 100, the plasticizer 101 is any of the plasticizers 14, 66, 77, and 84. The injection molder 100 includes the nozzle 103, via which the plasticized material 17 supplied from the plasticizer 101 is injected toward the molding die 104.

According to the configuration described above, the injection molder 100 includes any of the plasticizers 14, 66, 77, and 84 described above. The plasticizers 14, 66, 77, and 84 described above allow checking of the plasticization state in the screw. The injection molder 100 can therefore be an apparatus including a plasticizer that allows the checking of the plasticization state in the screw. When the injection molder 100 includes the plasticizer 84, the flat screw 106 is an in-line screw.

What is claimed is:

1. A plasticizer comprising: a drive motor; a flat screw that has a groove forming surface where a groove is formed and is rotated by the drive motor; a barrel which has a groove facing surface that faces the groove forming surface and in which a communication hole is formed; and a heater that heats a material supplied to a space between the flat screw and the barrel, wherein at least one of the flat screw and the barrel is at least partially formed of a transparent member, and the material between the flat screw and the barrel is visible through the transparent member, and
    wherein a central portion of the flat screw facing a central portion of the barrel is formed of the transparent member, and
    further comprising a detector that detects a plasticization state of the material between the flat screw and the barrel via the transparent member.
2. The plasticizer according to claim 1, wherein the central portion of the barrel is formed of the transparent member.
3. The plasticizer according to claim 1, further comprising a controller that controls at least one of a rotational speed of the flat screw and a temperature of the heater in accordance with the plasticization state of the material detected by the detector.
4. The plasticizer according to claim 3,
    wherein the heater is an infrared heater that heats the material in a non-contact manner via the transparent member.
5. The plasticizer according to claim 4,
    wherein an area heated by the heater has a circular shape.
6. A three-dimensional modeler comprising:
    the plasticizer according to claim 1;
    a nozzle via which a plasticized material supplied from the plasticizer is discharged; and
    a stage that receives the plasticized material discharged via the nozzle.
7. An injection molder comprising:
    the plasticizer according to claim 1; and
    a nozzle via which a plasticized material supplied from the plasticizer is injected toward a molding die.

* * * * *